UNITED STATES PATENT OFFICE.

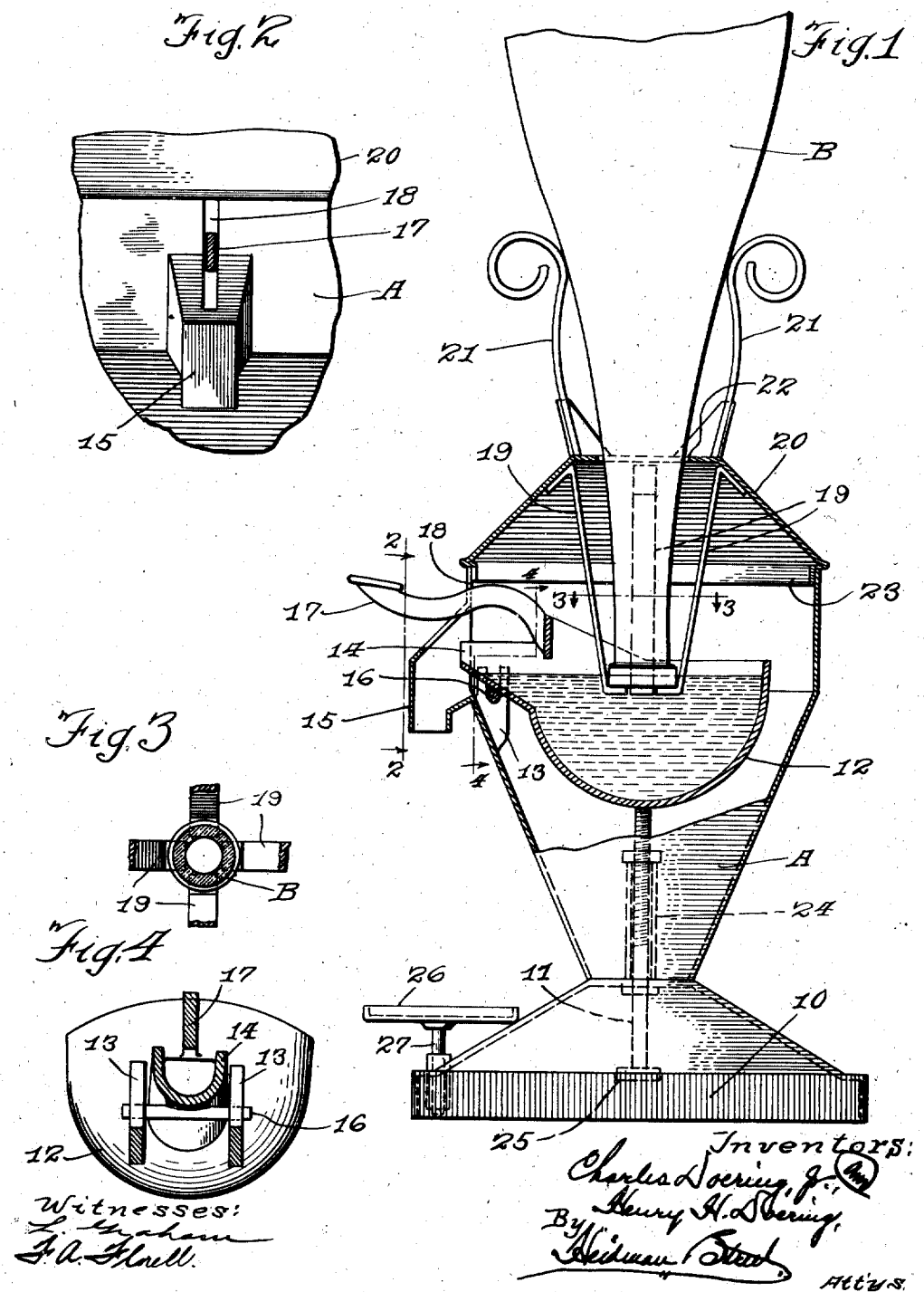

CHARLES DOERING, JR., AND HENRY H. DOERING, OF CHICAGO, ILLINOIS.

LIQUID-DISPENSING DEVICE.

1,225,418.  Specification of Letters Patent.  Patented May 8, 1917.

Application filed August 12, 1915. Serial No. 45,100.

*To all whom it may concern:*

Be it known that we, CHARLES DOERING, Jr., and HENRY H. DOERING, citizens of the United States, and residents of Chicago, in the county of Cook and State of Illinois, have invented a certain new and useful Improvement in Liquid-Dispensing Devices, of which the following is a description, reference being had to the accompanying drawing, which forms a part of our specification.

Our invention relates to a device adapted to dispense liquids in predetermined quantities through the manipulation of mechanism which may be easily adjusted so as to increase or diminish the quantity dispensed with each operation thereof.

The purpose of our invention is to provide a device of the nature herein set forth whereby liquid or beverages may be automatically dispensed or withdrawn from the original container, so that the liquid or beverage may be obtained in a sanitary manner.

A further object of our invention is to provide a device wherein the use of valves is entirely done away with, thus resulting in a device which is positive in operation, simple in construction, and easily manipulated; the construction being such that the possibility of becoming inoperative or out of order is practically eliminated; while the flow of the liquid from the original container will be automatically controlled by means of the seal formed by a quantity of the liquid or beverage discharged into the device; the seal being so formed that any leakage will be impossible, so that the device will dispense or discharge nothing more than the predetermined quantity it is intended to discharge.

Another object of our invention is to provide a device wherein the dispensing mechanism or measuring portion is so arranged that the quantity dispensed with each operation of the mechanism may be varied by merely changing the normal position of said mechanism; the invention being adapted to be used as herein disclosed, or in connection with coin-operated devices for dispensing liquids, as well as in connection with liquid or water coolers, as will be readily apparent from the following detailed description of the construction shown in the drawing wherein:—

Figure 1 is a partial side and partial vertical sectional view of our device, with a portion of a bottle shown inserted in place.

Fig. 2 is a front view of a portion of the device, taken on the line 2—2 of Fig. 1 looking in the direction of the arrows; the operating lever being shown in section.

Fig. 3 is a detail view, in section, taken on the line 3—3 of Fig. 1 looking downwardly as indicated by the arrows.

Fig. 4 is a vertical sectional view taken on the line 4—4 of Fig. 1 and looking in the direction of the arrows.

As an exemplification of our invention, we have illustrated the main or body portion of the device A, which may be of any desired shape or configuration, provided with a suitable base or standard 10, which may be open at the bottom, so as to permit access to the adjusting means 11, whereby the normal position of the dispensing and measuring device or reservoir 12, may be determined.

The dispensing device 12 is hung or pivotally mounted by means of the brackets 13, 13 in the holder or vessel A. The dispensing device 12 is shown in the nature of a cup provided on one side with a spout-portion 14 preferably arranged to protrude slightly through an opening in the wall of vessel A, as shown in Fig. 1, namely into a discharge-spout 15 formed on the front wall of vessel A, as clearly shown in Fig. 1. In the specific construction illustrated, the forward end of the cup-member or dispenser 12, namely the spout-portion 14, is provided with a transversely disposed pin, or trunnions 16, which fit into the brackets 13, as shown, so as to permit vertical oscillation or tilting movement of the cup or dispenser 12. The tilting movement of cup or member 12 is accomplished by means of a lever 17 secured at a suitable point to the cup-member or dispenser 12 and protruding through a suitable slot 18 arranged in the front wall of the casing or body portion A; the slot, in the particular exemplification, being shown as also extending into the upper wall of the spout 15, in order to permit sufficient downward movement of lever 17.

The spout-portion 14 of cup-member or dispenser 12 preferably extends slightly upwardly, as shown in Fig. 1, so as to have its discharge and normally extend into a horizontal plane above the plane occupied by the lower ends of the bottle-retaining prongs or members 19, which are secured to the cover-portion 20 of the receptacle or main portion A, as shown in Fig. 1.

The prongs or members 19 are secured to to the cover 20 in any suitable manner, and preferably extend downwardly in a converging manner, with the lower ends presented inwardly or toward each other, as shown in Fig. 1, so as to receive the neck of the inverted bottle or container B and prevent further inward movement thereof; at the same time not interfering with the proper discharge of the fluid from bottle or container B.

Any suitable construction may be employed for holding the inverted bottle in place; it being essential to hold the bottle in such manner that the mouth of the bottle extends into the cup-member 12 sufficiently beneath the upper edge thereof, as shown.

In order to properly support the container or bottle B in inverted position, we provide the cover-portion 20 with the upwardly extending fingers or supporting members 21, of which any suitable number may be provided, arranged so as to enable the container or bottle to be properly inserted through the opening 22 in the upper part of the cover-member 20; the opening 22 being preferably arranged so as to be substantially in line with the center or deepest portion of the cup-member or dispenser 12.

The cover-member 20 is shown provided with a flange portion 23 preferably arranged to extend into the main or body portion A, as shown in Fig. 1; although any suitable construction may be employed, whereby the cover will remain in place when a bottle is inverted into place.

As shown in Fig. 1, the cup-member or dispenser 12 is shown resting upon the adjusting mechanism or screw-rod 11 which extends upwardly through the lower part of the receptacle A; having threaded relation with the ferrule or sleeve 24 which is secured in the receptacle A in any suitable manner. Any suitable manner of adjustably securing the rod in place may be employed; and the lower end of screw-rod or member 11 may be provided with a suitable thumb-piece, indicated at 25, whereby the member or rod 11 may be easily screwed upwardly or downwardly as desired.

It is evident from the construction shown, that if the cup-member or dispenser 12 is moved upwardly by rod or member 11, a smaller quantity of liquid will be dispensed by member 12, because the distance between the bottom of the cup-member or dispenser 12 and the orifice of the bottle or container B will be decreased, so that a lesser quantity of liquid will be required to seal the orifice and thus prevent further flow from the bottle B.

It will be understood, of course, that the cup-member or dispenser 12 should not be lowered to such an extent, by means of screw 11, that the outlet end of spout-portion 14 will be brought into a plane beneath the horizontal plane occupied by the orifice of the bottle.

Screwing the member or rod 11 downwardly, will lower the normal portion of cup-member or dispenser 12, with the result that the quantity of liquid dispensed by member 12 will be increased, because the distance between the bottom of cup-member or dispenser 12 and the orifice of bottle B is thereby made greater. The mechanism, it will be understood, is preferably so constructed in actual practice, that the rear wall of cup-member 12 cannot be lowered beneath the plane of the orifice of bottle B.

It is evident from the construction shown and described that downward pressure on the free end of lever 17 will tilt cup-member or dispenser 12, on trunnions 16, so as to induce the liquid to flow out of the cup 12 and be discharged through spout 15. The construction and arrangement of cup-member 12 is such, however, that a slight quantity of liquid will remain in the bottom of the cup-member or dispenser 12 at a point coincident with the orifice of the bottle B. This small quantity of liquid is sufficient, however, to create a seal about the orifice of the bottle and prevent air entering the bottle, with the result that no liquid will flow out of the bottle while the member or dispenser 12 is being discharged. A very slight quantity of liquid in the bottom of the member or dispenser 12 is sufficient to seal the orifice of the bottle; and the moment member or dispenser 12 is dropped back to normal position, thereby breaking the seal formed by the small quantity of liquid, air will be permitted to enter the bottle and the flow of liquid from bottle B will again be permitted, until the quantity in the cup-member or dispenser 12 reaches a point where it will submerge the orifice of the bottle sufficiently to prevent the entrance of air into the bottle B.

The base of the receptacle A may be provided with a glass-holding tray, as shown at 26, in Fig. 1; the tray either being permanently secured to the base, or mounted on the stem or rod 27, which may extend into a suitable socket in the base portion of the device, so as to permit of its ready removal if desired.

As previously stated, the receptacle A may be given any desired shape; and the construction may be altered in certain respects without, however, departing from the spirit of our invention, and we do not wish to be understood as limiting ourselves to the exact construction shown and described.

What we claim is:—

1. A device of the class described, comprising a receptacle adapted to receive an inverted bottle or container, a reservoir tiltably mounted in the receptacle at a point beneath the orifice of the bottle and arranged to receive the orifice of the inverted bottle or container so that fluid in the reservoir will automatically control the flow of the liquid from the bottle or container, said reservoir being adapted to tilt upward toward the bottle orifice into discharging position without disturbing its receiving relation with the bottle.

2. A device of the class described, comprising a receptacle provided with a discharge opening, means for holding an inverted bottle or container, and a reservoir tiltably mounted in the receptacle and arranged to receive the orifice of the bottle or container so that fluid in the reservoir will automatically control the discharge from the bottle or container, said reservoir being arranged to discharge into the discharge-opening of the receptacle when the reservoir is tilted.

3. A device of the class described, comprising a receptacle provided with an opening in the top thereof adapted to receive an inverted bottle or container, the receptacle being provided with a discharge-opening, a reservoir tiltably mounted in the receptacle, and means arranged within the receptacle whereby the inverted bottle or container will be held in fixed relation to the normal position of the reservoir.

4. A device of the class described, comprising a receptacle adapted to receive an inverted bottle or container, a reservoir tiltably mounted in the receptacle, with the upper portion of the reservoir normally arranged in a horizontal plane above the plane of the orifice of the bottle, and a discharge-outlet in the receptacle arranged coincident with the discharge-end of the reservoir.

5. A device of the class described, comprising a receptacle provided with a holding portion adapted to receive an inverted bottle or container, a reservoir tiltably mounted in the receptacle and adapted to receive the orifice of the inverted bottle or container so that liquid in the reservoir will automatically control the flow from the bottle or container, and means whereby the reservoir may be tilted and liquid discharged therefrom.

6. A device of the class described, comprising a receptacle arranged to hold a bottle or container in inverted position, a reservoir tiltably mounted in the receptacle and arranged to receive the orifice of the inverted bottle or container so that liquid in the reservoir will automatically control the flow from the bottle or container, means for conveying the liquid discharged by the reservoir, and means whereby the reservoir may be tilted into discharging position.

7. A device of the class described, comprising a receptacle provided with means for holding a bottle or container in inverted position, a reservoir tiltably mounted in the receptacle and arranged to receive the orifice of the inverted bottle or container so that liquid in the reservoir will automatically control the flow from the bottle or container, means whereby the reservoir may be tilted into discharging position, and means whereby the relative position of the reservoir to the orifice of the bottle or container may be adjusted.

8. A device of the class described, comprising a receptacle adapted to receive an inverted bottle or container, the receptacle being provided with a discharge-spout, a reservoir tiltably mounted in the receptacle and so arranged that liquid in the reservoir will automatically control the discharge from the bottle or container, said reservoir being provided with a discharge portion adapted to register with the discharge-spout of the receptacle, means whereby the reservoir may be tilted into discharging position, and means whereby the normal relation between the reservoir and the orifice of the bottle or container may be altered.

9. A device of the class described, comprising a body portion having an opening adapted to receive the neck of an inverted bottle or container and provided with a discharge-spout, a liquid-receiving member tiltably mounted in said body-portion and provided with a discharge portion arranged to register with said discharge-spout, said member being mounted so as to automatically return to normal position, and means arranged to move said member vertically so as to alter its normal relation with the orifice of the bottle or container and thereby regulate the quantity of liquid to be discharged with each operation of said member.

10. A liquid dispenser, comprising a body-portion, a cover having an opening adapted to receive the neck of an inverted bottle, upwardly presented means on said cover surrounding the opening for supporting the bottle, a liquid-receiving member tiltably mounted in the body-portion so as to surround the orifice of the bottle and permit vertical oscillation of the member, a discharge-opening in the body-portion with which the discharge end of the member registers, means extending exteriorly of the body-portion whereby said member may be oscillated into discharging position, and adjustable means whereby the normal position of said member may be altered and the quantity of liquid discharged determined.

11. A liquid dispensing device, comprising a receptacle adapted to hold a bottle or container in inverted position, a cup-member tiltably mounted so as to swing vertically, the relation between said cup-member and the bottle or container being such that the upper edge of said member will extend into a plane above that of the orifice of the bottle or container, and means whereby said member may be oscillated into discharging position, a discharge member arranged in juxtaposition to the discharge-side of said cup-member, and an adjustable member adapted to affect the normal relation between the cup-member and the bottle or container.

CHARLES DOERING, Jr.
HENRY H. DOERING.

Witnesses:
J. H. BAUMGARTNER,
FRANK DOERING.